US010746280B2

(12) United States Patent
Kamaguchi et al.

(10) Patent No.: US 10,746,280 B2
(45) Date of Patent: Aug. 18, 2020

(54) STEERING DEVICE

(71) Applicant: HITACHI AUTOMOTIVE SYSTEMS, LTD., Hitachinaka-shi, Ibaraki (JP)

(72) Inventors: Yoshiharu Kamaguchi, Chiba (JP); Masato Kadokura, Kunitachi (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 16/515,827

(22) Filed: Jul. 18, 2019

(65) Prior Publication Data

US 2020/0025282 A1 Jan. 23, 2020

(30) Foreign Application Priority Data

Jul. 19, 2018 (JP) .................................. 2018-135439

(51) Int. Cl.
| *F16H 57/02* | (2012.01) |
| *F16H 19/02* | (2006.01) |
| *B62D 3/12* | (2006.01) |
| *F16H 57/031* | (2012.01) |
| *F16H 57/029* | (2012.01) |
| *B62D 1/20* | (2006.01) |
| *F16D 3/84* | (2006.01) |
| *F16H 19/04* | (2006.01) |

(52) U.S. Cl.
CPC ............. *F16H 57/031* (2013.01); *B62D 1/20* (2013.01); *B62D 3/126* (2013.01); *F16D 3/845* (2013.01); *F16H 19/04* (2013.01); *F16H 57/029* (2013.01); *F16H 2057/02082* (2013.01)

(58) Field of Classification Search
CPC ...... F16H 19/04; F16H 57/029; F16H 57/031; F16H 57/032; F16H 2057/02082; B62D 1/20; B62D 3/12; B62D 3/126; F16F 9/38; F16D 3/84; F16D 3/843; F16D 3/845
See application file for complete search history.

(56) References Cited

U.S. PATENT DOCUMENTS

| 4,229,994 A | * | 10/1980 | Plamper | ................... B62D 1/10 74/552 |
| 5,431,379 A | * | 7/1995 | Takagi | ................... B62D 5/083 267/273 |
| 5,833,542 A | * | 11/1998 | Harrold | ............... B29C 66/1122 464/175 |

(Continued)

FOREIGN PATENT DOCUMENTS

| CA | 2619580 C | * | 2/2001 | ............... B62K 5/01 |
| JP | 2017-180542 A | | 10/2017 | |

*Primary Examiner* — Adam D Rogers
(74) *Attorney, Agent, or Firm* — Foley & Lardner LLP

(57) ABSTRACT

A steering device includes: an input shaft main body portion including an input shaft first region, and protruding from the housing, and an input shaft second region received within the steering shaft receiving space; and an input shaft cover including; an input shaft cover main body portion surrounding a portion of the input shaft first region which is closer to the input shaft second end portion than the first input shaft seal portion in the rotation axis direction, and an input shaft cover seal portion provided to the input shaft cover main body portion, abutted on the first input shaft seal portion, and arranged to suppress moisture from entering between the input shaft and the input shaft cover.

15 Claims, 8 Drawing Sheets

(56) References Cited

U.S. PATENT DOCUMENTS

| | | | | |
|---|---|---|---|---|
| 5,899,294 | A * | 5/1999 | Shimizu | B62D 5/043 |
| | | | | 180/444 |
| 7,765,888 | B2 * | 8/2010 | Kojima | B62D 3/12 |
| | | | | 74/388 PS |
| 8,579,071 | B2 * | 11/2013 | Yoshida | B62D 6/10 |
| | | | | 180/443 |
| 8,584,790 | B2 * | 11/2013 | Ohnishi | G01L 5/221 |
| | | | | 180/422 |
| 9,469,332 | B2 * | 10/2016 | Yoshida | B62D 1/20 |
| 9,731,753 | B2 * | 8/2017 | Haegele | B62D 5/065 |
| 2017/0276231 | A1 | 9/2017 | Sekikawa et al. | |
| 2019/0185047 | A1 * | 6/2019 | Fujita | B62D 5/0403 |
| 2019/0263442 | A1 * | 8/2019 | Yoshida | B62D 5/04 |

* cited by examiner

STEERING DEVICE

BACKGROUND OF THE INVENTION

The present invention relates to a steering device.

A Japanese patent application publication No. 2017-180542 (corresponding to U.S. patent application publication No. 2017/276231) discloses a conventional steering device including a housing having a steering shaft receiving space which receives a steering shaft (input shaft), and which has an upper end opening portion; and a cover member provided to the upper end opening portion, and arranged to protect a seal member, and to suppress moisture into from entering the steering shaft receiving space.

SUMMARY OF THE INVENTION

However, the cover member of the above-described steering device covers only the opening portion of the steering shaft receiving space. Accordingly, it is possible to suppress foreign objects and moisture from entering the steering shaft receiving space. However, it is difficult to prevent rust of the input shaft exposed from the steering shaft receiving space. Consequently, the rust is generated around the seal member of the input shaft. The seal member may be damaged due to this rust.

It is, therefore, an object of the present invention to provide a steering device devised to solve the above-mentioned problems, and to suppress the generation of the rust around the seal member in the input shaft.

According to one aspect of the present invention, a steering device comprises: a housing including a steering shaft receiving space, and a seal member receiving space; an input shaft made from a metal, the input shaft including; an input shaft main body portion which has a rod shape, which is rotatably received in the steering shaft receiving space, which includes an input shaft first end portion and an input shaft second end portion that are both end portions in a rotation axis direction of the input shaft main body portion, and which includes an input shaft first region that includes the input shaft first end portion, and that protrudes from the housing, and an input shaft second region that includes the input shaft second end portion, and that is received within the steering shaft receiving space, a torsion bar insertion hole which is provided within the input shaft main body portion, and which extends from the input shaft second end portion to the input shaft first end portion, an input shaft retaining pin insertion hole which is provided in the input shaft first region, which extends across the torsion bar insertion hole in a radial direction of the input shaft main body portion, and a first input shaft seal portion provided in the input shaft first region between the input shaft first end portion and the input shaft retaining pin insertion hole in the rotation axis direction of the input shaft main body portion; an output shaft rotatably provided within the steering shaft receiving space; a torsion bar having a rod shape, including a torsion bar first end portion and a torsion bar second end portion which are a pair of end portions, including a torsion bar first region including the torsion bar first end portion, and a torsion bar second region including the torsion bar second end portion, and the torsion bar including; a torsion bar first fixing portion which is provided in the torsion bar first region, and which includes a torsion bar retaining pin insertion hole extending in the radial direction of the input shaft main body portion, and extending in series with the input shaft retaining pin insertion hole, and a torsion bar second fixing portion provided in the torsion bar second region, and connected to the output shaft; a retaining pin which is inserted into the input shaft retaining pin insertion hole and the torsion bar retaining pin insertion hole, and which connects the input shaft and the torsion bar; a seal member provided within the seal member receiving space; a transmitting shaft arranged to turn steered wheels in accordance with the rotation of the output shaft; an actuator arranged to provide a steering force to the output shaft in accordance with a torsion amount of the torsion bar; and an input shaft cover including; an input shaft cover main body portion having a cylindrical shape, and surrounding a portion of the input shaft first region which is closer to the input shaft second end portion than the first input shaft seal portion in the rotation axis direction of the input shaft main body portion, and an input shaft cover seal portion provided to the input shaft cover main body portion, abutted on the first input shaft seal portion, and arranged to suppress moisture from entering between the input shaft and the input shaft cover.

BRIEF DESCRIPTION OF THE DRAWINGS

FIG. 6A is a plan view. FIG. 6B is a side view.

DETAILED DESCRIPTION OF THE INVENTION

Hereinafter, steering devices according to embodiments of the present invention are explained in detail with reference to the drawings. Besides, in the below-described embodiments, the present invention is applied to a steering device of a vehicle, similarly to the conventional device.

(Configuration of Steering Device)

Figure 1:
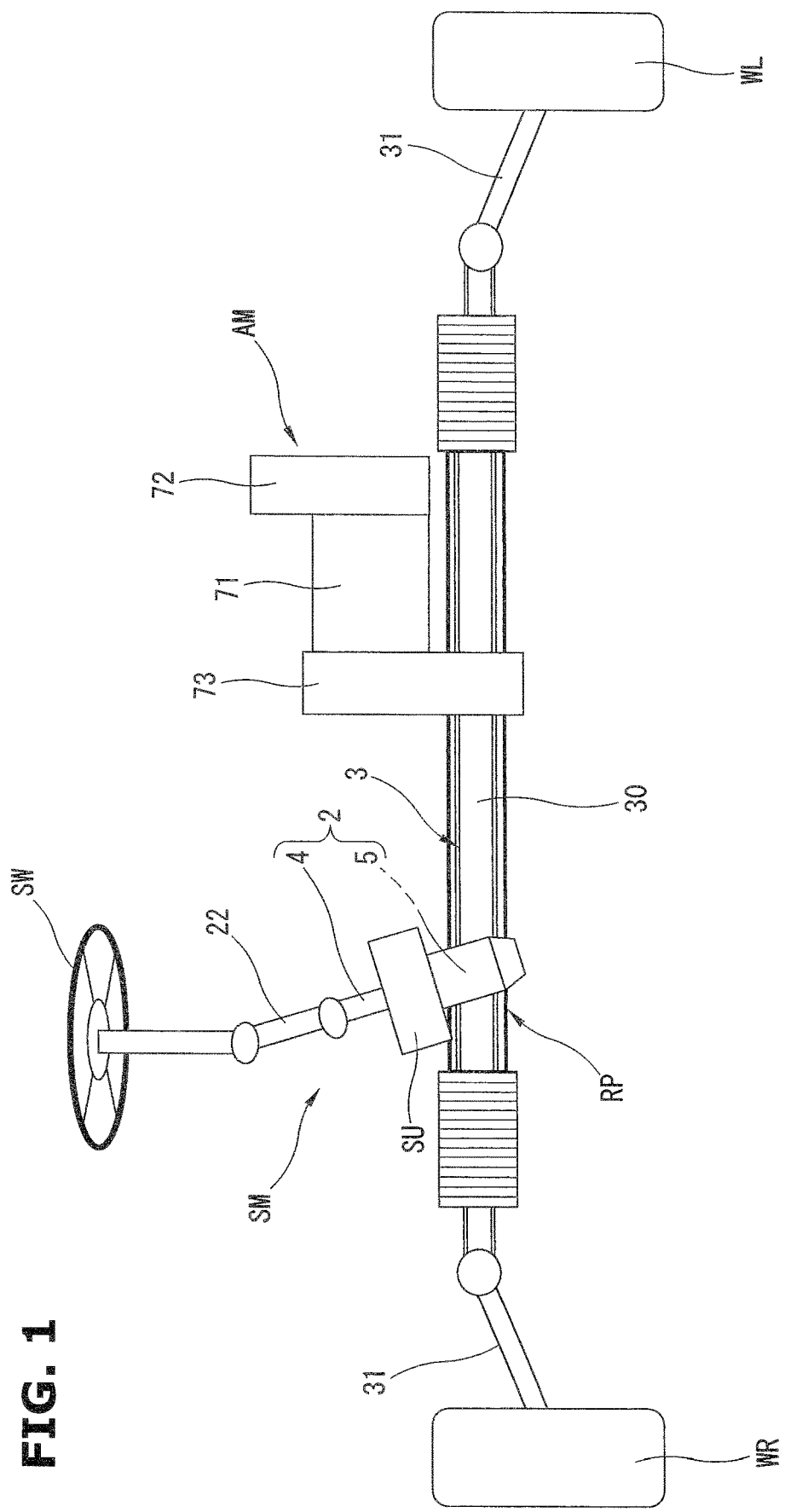
FIG. 1 is a system configuration view showing a steering device according to embodiments of the present invention.

FIG. 1 is a system configuration view showing a steering device according to a first embodiment of the present invention. Besides, in below-described explanations based on the drawing, an "axial direction" is defined by a direction parallel to a rotation axis Z of a steering shaft 2. A "radial direction" is defined by a direction perpendicular to the rotation axis Z of the steering shaft 2. A "circumferential direction" is defined by a direction around the rotation axis Z of the steering shaft 2. As to the axial direction, a first end side is defined by an upper side of FIG. 1. A second end side is defined by a lower side of FIG. 1.

As shown in FIG. 1, the steering device includes a steering mechanism SM for the steering based on operation of a driver; and a steering assist mechanism AM arranged to assist the steering operation of the driver.

The steering mechanism SM includes a steering shaft 2 linked to a steering wheel SW; and a rack bar 3 which is a transmitting shaft linked to steered wheels WR and WL. The steering shaft 2 and the rack bar 3 are linked through a conversion mechanism RP. The conversion mechanism RP is a rack and pinion mechanism including pinion teeth 50 formed on the steering shaft 2 (an output shaft 5 described later), and rack teeth 30 formed on the rack bar 3. Besides, the transmitting shaft according to the present invention may be, for example, a pitman arm of a ball nut type steering device, in addition to the rack and pinion steering device according to this embodiment.

Figure 2:
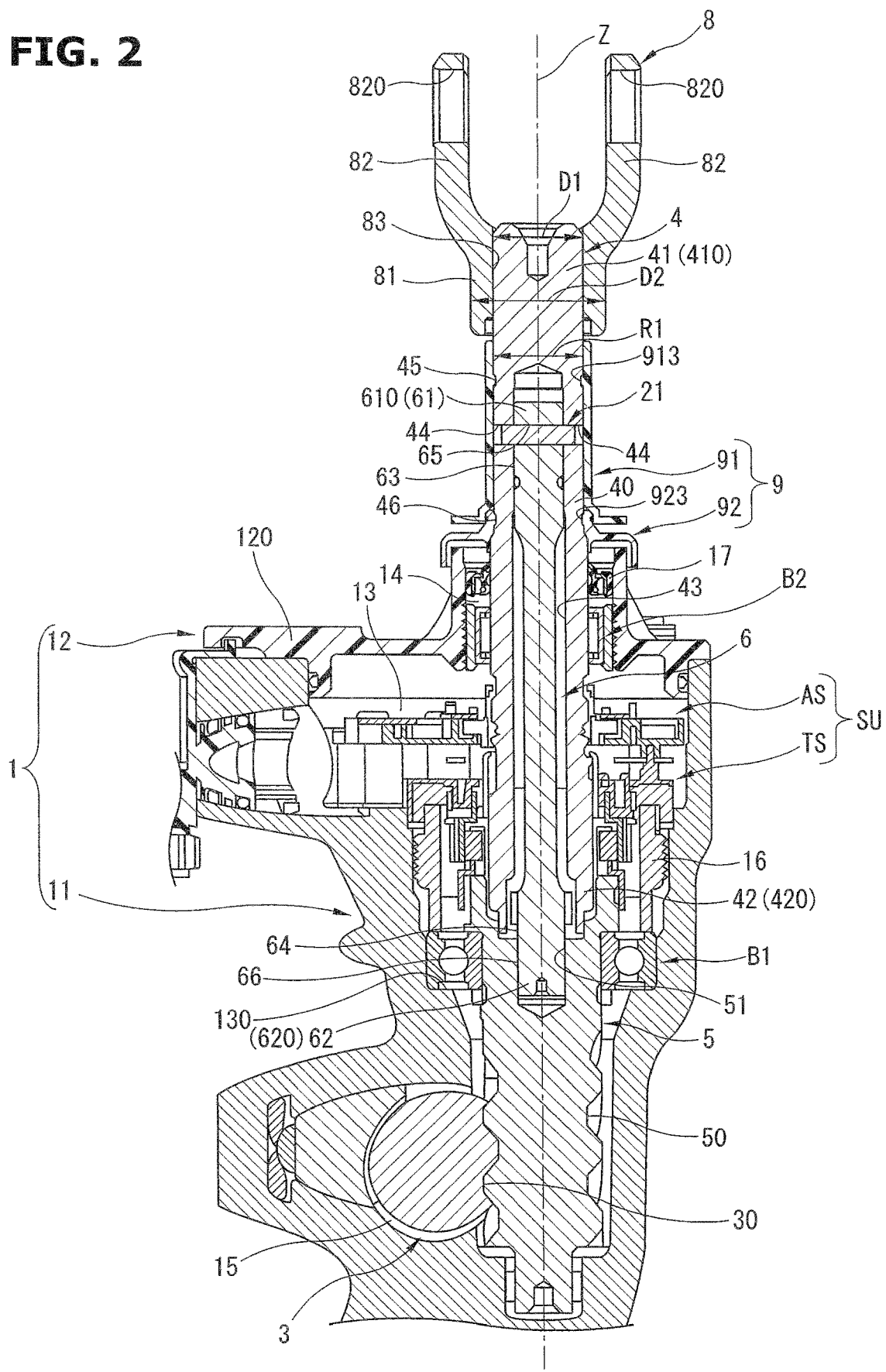
FIG. 2 is a sectional view taken along an axial direction of a steering shaft of a steering device according to a first embodiment of the present invention.

The steering shaft 2 includes an input shaft 4 which is a first shaft member arranged to rotate as a unit with the steering wheel SW; and an output shaft 5 which is a second shaft member linked to the rack bar 3. The input shaft 4 and the output shaft 5 are linked through a torsion bar 6, as shown in FIG. 2. The input shaft 4 includes a first axial end portion connected to the steering wheel SW; and a second axial end portion connected to the torsion bar 6. The output shaft 5 includes a first axial end portion connected to the torsion bar 6; and a second axial end portion linked to the rack bar 3. That is, the pinion teeth 50 formed on an outer circumference side of the second axial end portion of the output shaft 5 is engaged with the rack teeth 30 formed on the first axial end portion of the rack bar 3, so that the rotation of the output shaft 5 is converted to an axial movement of the rack bar 3, and transmitted to the rack bar 3.

Moreover, a sensor unit SU is integrally provided on the outer circumference side of the steering shaft 2. The sensor unit SU includes a steering angle sensor AS (cf. FIG. 2) arranged to sense a steering angle which is a rotation angle of the steering shaft 2; and a torque sensor TS (cf. FIG. 2) arranged to sense a steering torque provided to the steering shaft 2 based on the steering operation of the driver. The steering angle sensor AS is arranged to sense the steering angle based on a rotation angle difference between a pair of gears (not shown) arranged to be rotated in accordance with the rotation of the steering shaft 2. The torque sensor TS is arranged to sense the steering torque based on the relative rotation displacement between the input shaft 4 and the output shaft 5.

The rack bar 3 includes both axial end portions linked through tie rods 31 and 31 and knuckle arms (not shown) to the steered wheels WR and WL. That is, the rack bar 3 is arranged to be moved in the axial direction to push or pull the knuckle arms (not shown) through the tie rods 31 and 31, and thereby to vary (turn) the directions of the steered wheels WR and WL.

The steering assist mechanism AM includes an electric motor 71 which is an actuator arranged to produce a steering assist force; a control device 72 which is an ECU configured to control and drive the electric motor 71; and a transmitting mechanism 73 arranged to transmit the rotation of the electric motor 71 to the rack bar 3. That is, the steering assist mechanism AM is arranged to control and drive the electric motor 71 based on detection results by various sensors such as the steering angle sensor AS, the torque sensor TS, and a vehicle speed sensor (not shown), which are inputted through sensor harnesses and so on to the control device 72, and to assist the axial movement of the rack bar 3 by the rotation force of the motor 71. Besides, the actuator according to the present invention may be a power cylinder of a hydraulic power steering device and so on, in addition to the electric motor of the electric power steering device in this embodiment. Moreover, the actuator according to the present invention may be an actuator arranged to directly provide the steering force to the output shaft 5, or an actuator arranged to indirectly provide the steering force through another member to the output shaft 5.

The transmitting mechanism 73 includes a belt which is a transmitting member arranged to transmit the rotation of the electric motor 71; and a ball screw mechanism which is a speed reduction mechanism arranged to decrease the speed of the rotation of the electric motor 71 which is transmitted through this belt. In particular, the belt is wound between an output side pulley (not shown) fixed to an output shaft of the electric motor 71, and an input side pulley (not shown) provided on the outer circumference side of the rack bar 3. Moreover, the ball screw mechanism is provided on an inner circumference side of the input side pulley (not shown). With this, the speed of the rotation of the input side pulley which is rotated in synchronous with the output shaft of the electric motor 71 through the belt is decreased, and transmitted to the rack bar 3.

First Embodiment

FIG. 2 to FIG. 8 show the steering device according to the first embodiment of the present invention.

Figure 3:
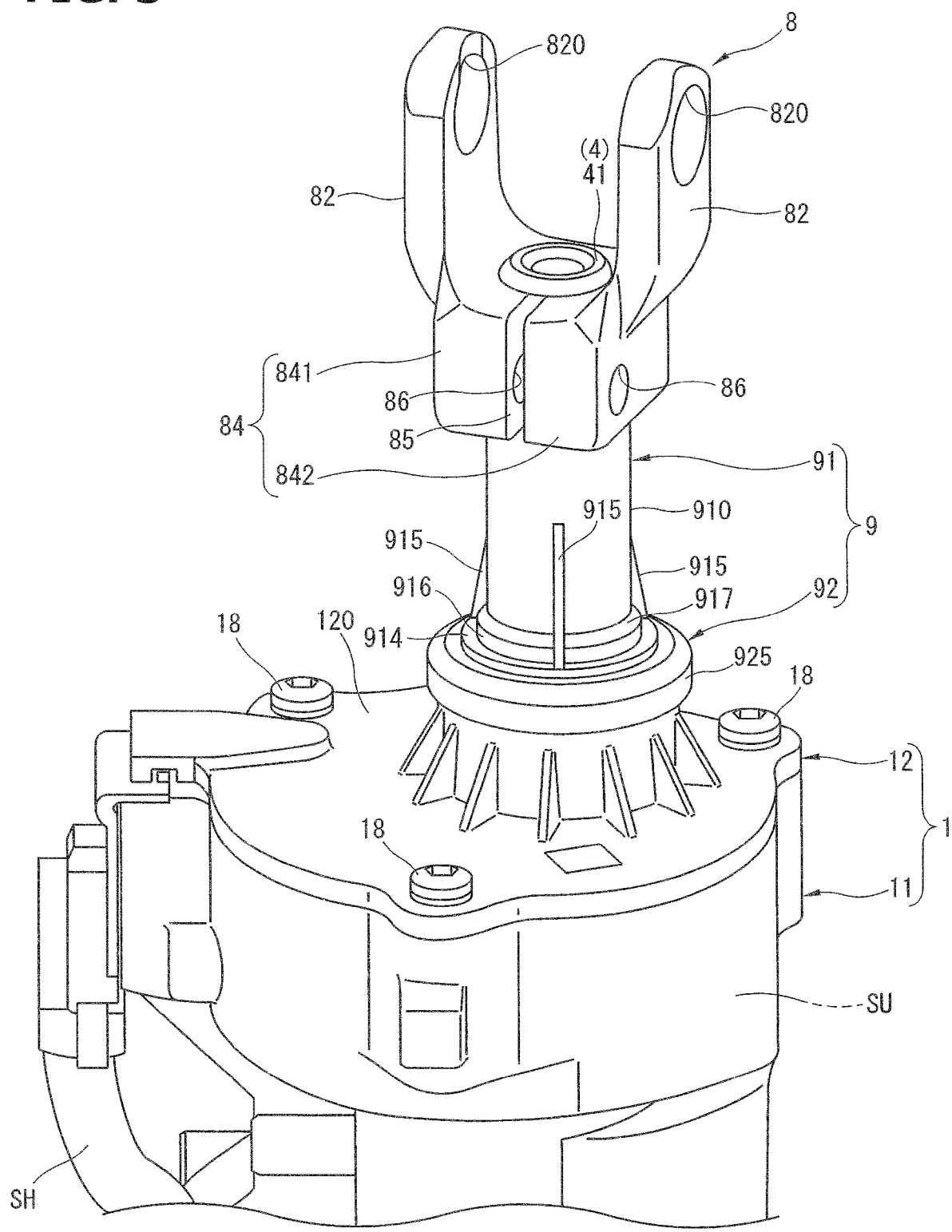
FIG. 3 is an enlarged perspective view showing main parts of the steering device shown in FIG. 1.

FIG. 2 is a longitudinal sectional view which shows the steering device shown in FIG. 1, and which is taken along the steering shaft. FIG. 3 is an enlarged perspective view showing main parts of the steering device by enlarging a portion near the input shaft cover 9. In below-described explanations based on the drawings, an "axial direction" is defined by a direction parallel to the rotation axis Z of the steering shaft 2 (an input shaft main body portion 40). A "radial direction" is defined by a direction perpendicular to the rotation axis Z of the steering shaft 2 (the input shaft main body portion 40). A "circumferential direction" is defined by a direction around the rotation axis Z of the steering shaft 2 (the input shaft main body portion 40). Moreover, a "first end side" in the axial direction is defined by an upper side in FIG. 2. A "second end side" in the axial direction is defined by a lower side in FIG. 2. Furthermore, an end portion of the input shaft 4 on the first end side in the axial direction is referred to as an "input shaft first end portion 41". An end portion of the input shaft 4 on the second end side in the axial direction is referred to as an "input shaft second end portion 42". Similarly, an end portion of the torsion bar 6 on the first end side in the axial direction is referred to as a "torsion bar first end portion 61". An end portion of the torsion bar 6 on the second end side in the axial direction is referred to as a "torsion bar second end portion 62".

As shown in FIGS. 2 and 3, in the steering device, the first end side of the steering shaft 2 in the axial direction is exposed from the housing 1, and linked through a universal joint 8 to the steering wheel SW. The second end side of the steering shaft 2 in the axial direction is received within the housing 1, and engaged with the rack bar 3 within the housing 1.

The housing 1 has a two divided configuration in the axial direction. That is, the housing 1 includes a first housing 11 including a steering shaft receiving space (chamber) 13 which is formed within the first housing 11, and which receives the steering shaft 2; and a second housing 12 which is combined on the first end side of the first housing 11 in the axial direction, and which includes a seal member receiving space 14 that is formed within the second housing 12, and that receives a seal member 17 described later.

The first housing 11 is made from metal such as aluminum alloy. The first housing 11 has a bottomed cylindrical shape. The first housing 11 includes the steering shaft receiving space 13 having a first axial end portion which is opened, and a second axial end portion which is closed. The steering shaft receiving space 13 has a stepped shape whose diameters are decreased toward the second end side in the axial direction. The steering shaft receiving space 13 receives the second axial end portion of the steering shaft 2, the sensor unit SU formed by integrating the steering angle sensor AS and the torque sensor TS, and a first bearing B1 rotatably supporting the second axial end side (the output shaft 5) of the steering shaft 2. Besides, an outer wheel of the first bearing B1 is sandwiched by a cylindrical lock nut 16 and a stepped portion 130 of the steering shaft receiving space 13, so as to hold the first bearing B1. Moreover, the first housing 11 includes a transmitting shaft receiving space 15 which is formed in a second axial end portion of the steering shaft receiving space 13, and which extends in the radial direction to be perpendicular to the steering shaft receiving space 13. The transmitting shaft receiving space 15 receives the rack bar 3 which is the transmitting shaft.

The second housing 12 is made from resin. The second housing 12 has a substantially cylindrical shape. The second housing 12 includes the seal member receiving space 14 which is formed within the second housing 12, and which extends in the axial direction. This seal member receiving space 14 receives the seal member 17 arranged to suppress moisture (water) from entering from the outside into the housing 1. Moreover, a second bearing B2 is received within the seal member receiving space 14 on the second end side of the seal member 17 in the axial direction. The second bearing B2 is arranged to rotatably support the first end side (the input shaft 4) of the steering shaft 2. Furthermore, the second housing 12 includes a flange portion 120 which is formed on the outer circumference portion of the second axial end portion of the second housing 12, and which extends in the radial direction. The second housing 12 is tightened to the first housing 11 through this flange portion 120 by a plurality of screws 18 (cf. FIG. 3).

The steering shaft 2 includes the input shaft 4 linked to the steering wheel SW; and the output shaft 5 linked to the rack bar 3. The input shaft 4 and the output shaft 5 are disposed to confront each other in the axial direction. The input shaft 4 and the output shaft 5 are connected through the torsion bar 6 received between the input shaft 4 and the output shaft 5. In particular, the input shaft 4 and the first axial end portion of the torsion bar 6 are connected by, for example, a retaining pin 21. The output shaft 5 and the second axial end portion of the torsion bar 6 are connected by, for example, splines (not shown).

The input shaft 4 is integrally made from metal. The input shaft 4 includes the input shaft main body portion 40 which has a rod shape, and which includes the input shaft first end portion 41 and the input shaft second end portion 42 which are both end portions of the input shaft main body portion 40 in the axial direction. Moreover, the input shaft 4 includes a first region 410 including the input shaft first end portion 41; and a second region 420 including the input shaft second end portion 42. The first region 410 protrudes from the housing 1 to be exposed to the outside. On the other hand, the second region 420 is rotatably received within the steering shaft receiving space 13 of the housing 1.

The input shaft main body portion 40 includes a torsion bar insertion hole 43 which is formed and opened on the second axial end side, and which extends from the input shaft second end portion 42 toward the input shaft first end portion 41 in the axial direction. The torsion bar 6 is inserted into the torsion bar insertion hole 43. The torsion bar insertion hole 43 has a substantially constant inside diameter slightly greater than an outside diameter of a torsion bar first fixing portion 63 (described later).

The input shaft main body portion 40 includes an input shaft retaining pin insertion hole 44 formed in the input shaft first region 410 which is overlapped with the torsion bar insertion hole 43 in the axial direction. The input shaft retaining pin insertion hole 44 is a through hole which has a circular cross section, into which the retaining pin 21 linking the input shaft 4 and the torsion bar 6 is inserted, and which is formed in the radial direction of the input shaft main body portion 40 across the torsion bar insertion hole 43.

Moreover, the input shaft 4 is connected through the known universal joint 8 mounted to the input shaft first end portion 41, to an intermediate shaft 22 which is a steering wheel side steering shaft linked to the steering wheel SW (cf. FIG. 1). The universal joint 8 includes a base portion 81 connected to the input shaft 4; and a bifurcated yoke portions 82 and 82 which is integrally provided with the base portion 81, and which is connected to a universal joint (yoke portion) (not shown) on the intermediate shaft 22 side that is a counterpart, through cross shaft (not shown). The yokes 82 and 82 include, respectively, engagement holes 820 and 820 with which the cross shaft (not shown) is engaged.

Furthermore, the base portion 81 of the universal joint 8 has a substantially cylindrical shape. The base portion 81 of the universal joint 8 has an outside diameter D2 which is greater than an outside diameter D1 of the input shaft main body portion 40 by a first length. The base portion 81 includes an input shaft through hole 83 which is formed at a substantially central portion of the base portion 81 to extend in the axial direction, and through which the input shaft first end portion 41 penetrates. Moreover, the base portion 81 includes an extension portion 84 which is formed between the yokes 82 and 82, and which extends in the radial directions. This extension portion 84 includes a slit 85 dividing the extension portion 84 into two portions, and penetrating through the extension portion 84 from the input shaft through hole 83 in the radial direction. The inside diameter of the input shaft through hole 83 can be adjusted by adjusting a width of the slit 85. Furthermore, the extension portion 84 includes a pair of extension portions 841 and 842 which are apart from each other to sandwich the slit 85. The extension portions 841 and 842 include, respectively, bolt through holes 86 and 86 which penetrate in a tangent direction of the input shaft through hole 83 to be perpendicular to the slit 85, and through which a bolt (not shown) penetrates. In the above-described configuration, nuts (not shown) and the bolt (not shown) inserted into the bolt through holes 86 and 86 sandwich the extension portions 841 and 842 to decrease the width of the slit 85. With this, the inside diameter of the input shaft through hole 83 is decreased, so that the universal joint 8 is tightened to the input shaft first end portion 41.

The input shaft main body portion 40 includes a first input shaft seal portion 45 provided in the input shaft first region 410 between the input shaft first end portion 41 and the input shaft retaining pin insertion hole 44 in the axial direction. A first input shaft cover seal portion 913 (described later) is abutted on the first input shaft seal portion 45. The first input shaft seal portion 45 is continuously formed in the circumferential direction. The first input shaft seal portion 45 is an annular groove which has a recessed section, and which is slightly recessed in the radially inward direction from the outer circumference of a general portion of the input shaft main body portion 40. The abutment between the first input shaft seal portion 45 and the first input shaft cover seal portion 913 described later suppresses the moisture entering between the input shaft 4 and the first input shaft cover member 91.

The input shaft main body portion 40 includes a second input shaft seal portion 46 is provided in the input shaft first region 410 between the first input shaft cover seal portion 913 and the seal member 17 in the axial direction. A second input shaft cover seal portion 923 (described later) is abutted on the second input shaft seal portion 46. The second input shaft seal portion 46 is continuously formed in the circumferential direction. The second input shaft seal portion 46 is an annular groove which has a recessed section, and which is slightly recessed in the radially inward direction from the outer circumference of the general portion of the input shaft main body portion 40. The abutment between the second input shaft seal portion 46 and the second input shaft cover seal portion 923 described later suppresses the moisture entering between the input shaft 4 and the second input shaft cover member 92.

The output shaft 5 includes an internal spline portion 51 formed at the first axial end portion of the output shaft 5, and arranged to be engaged with an external spline portion 66 (described later) of the torsion bar 6. By this spline connection between the internal spline portion 51 and the external spline portion 66, the output shaft 5 is connected to the torsion bar 6 to rotate as a unit with the torsion bar 6. Moreover, the output shaft 5 includes the pinion teeth 50 which are formed at the second axial end portion of the output shaft 5 that confronts the rack bar 3, and which are arranged to be engaged with the rack teeth 30 of the rack bar 3. By the above-described configuration, the output shaft 5 is rotated to follow the input shaft 4 by the rotational force of the input shaft 4 which is transmitted through the torsion bar 6, so that the rotational force of the output shaft 5 is converted to the axial movement force of the rack bar 3.

The torsion bar 6 has a rod shape. The torsion bar 6 includes a torsion bar first fixing portion 63 which has a relatively large diameter, and which is provided at the first axial end portion of the torsion bar 6; a torsion bar second fixing portion 64 which has a relatively large diameter, and which is provided at the second axial end portion of the torsion bar 6; and an intermediate portion having a small diameter. The torsion bar first fixing portion 63 includes a torsion bar retaining pin insertion hole 65 which is formed in a torsion bar first region 610 including the torsion bar first end portion 61, at an axial position confronting the input shaft retaining pin insertion hole 44. The torsion bar retaining pin insertion hole 65 is a through hole having a circular cross section, and extending in series with the input shaft retaining pin insertion hole 44. The torsion bar retaining pin insertion hole 65 is formed along the radial direction of the torsion bar first fixing portion 63. On the other hand, the torsion bar second fixing portion 64 is provided in the torsion bar second region 620 including the torsion bar second end portion 62. The torsion bar second fixing portion 64 includes the external spline portion 66 which is formed on the outer circumference side of the torsion bar second fixing portion 64, and which is arranged to be engaged with the internal spline portion 51 of the output shaft 5.

Moreover, the input shaft cover 9 is provided radially outside the input shaft first region 410 exposed from the housing 1. The input shaft cover 9 covers the input shaft first region 410. The input shaft cover 9 includes a first input shaft cover member 91 surrounding a predetermined axial range of the input shaft first region 410 which includes the first input shaft seal portion 45; and a second input shaft cover member 92 which is provided at a portion of the input shaft first region 410 which is closer to the input shaft second end portion 42 than the first input shaft cover member 91, and which covers the opening portion of the seal member receiving space 14 of the housing 1. The first input shaft cover member 91 and the second input shaft cover member 92 are made from the same resin, for example, elastomer.

Besides, in this embodiment, the input shaft cover 9 is divided into the two members. However, the input shaft cover 9 according to the present invention is not limited to this divided configuration. That is, the input shaft cover 9 according to the present invention may be constituted only by the first input shaft cover member 91 by enlarging the first input shaft cover member 91 toward the second end side in the axial direction. Alternatingly, the input shaft cover 9 may be constituted by one member by integrally constituting the first input shaft cover member 91 and the second input shaft cover member 92.

Figure 4:
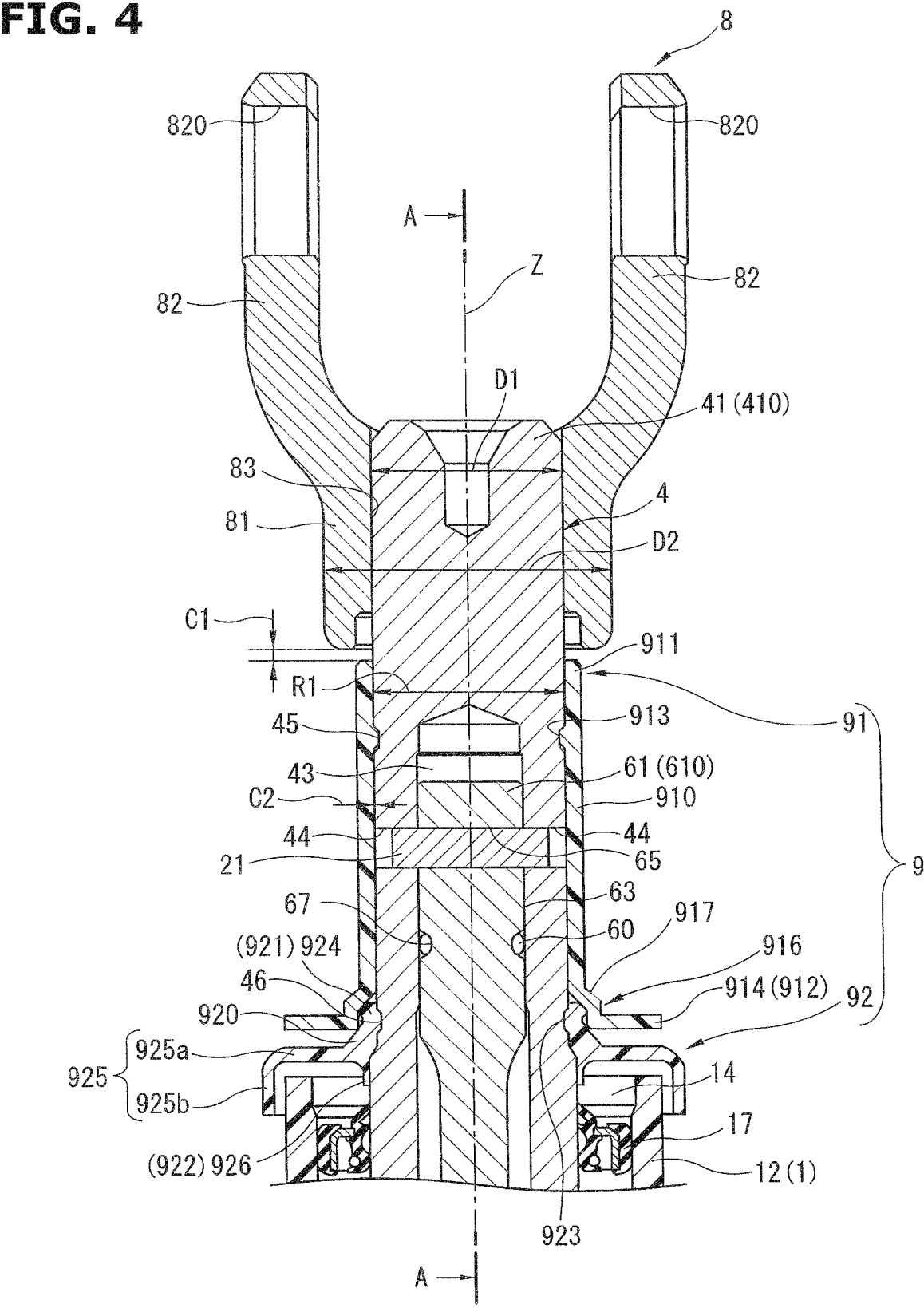
FIG. 4 is an enlarged view showing main parts in FIG. 2.
Figure 5:
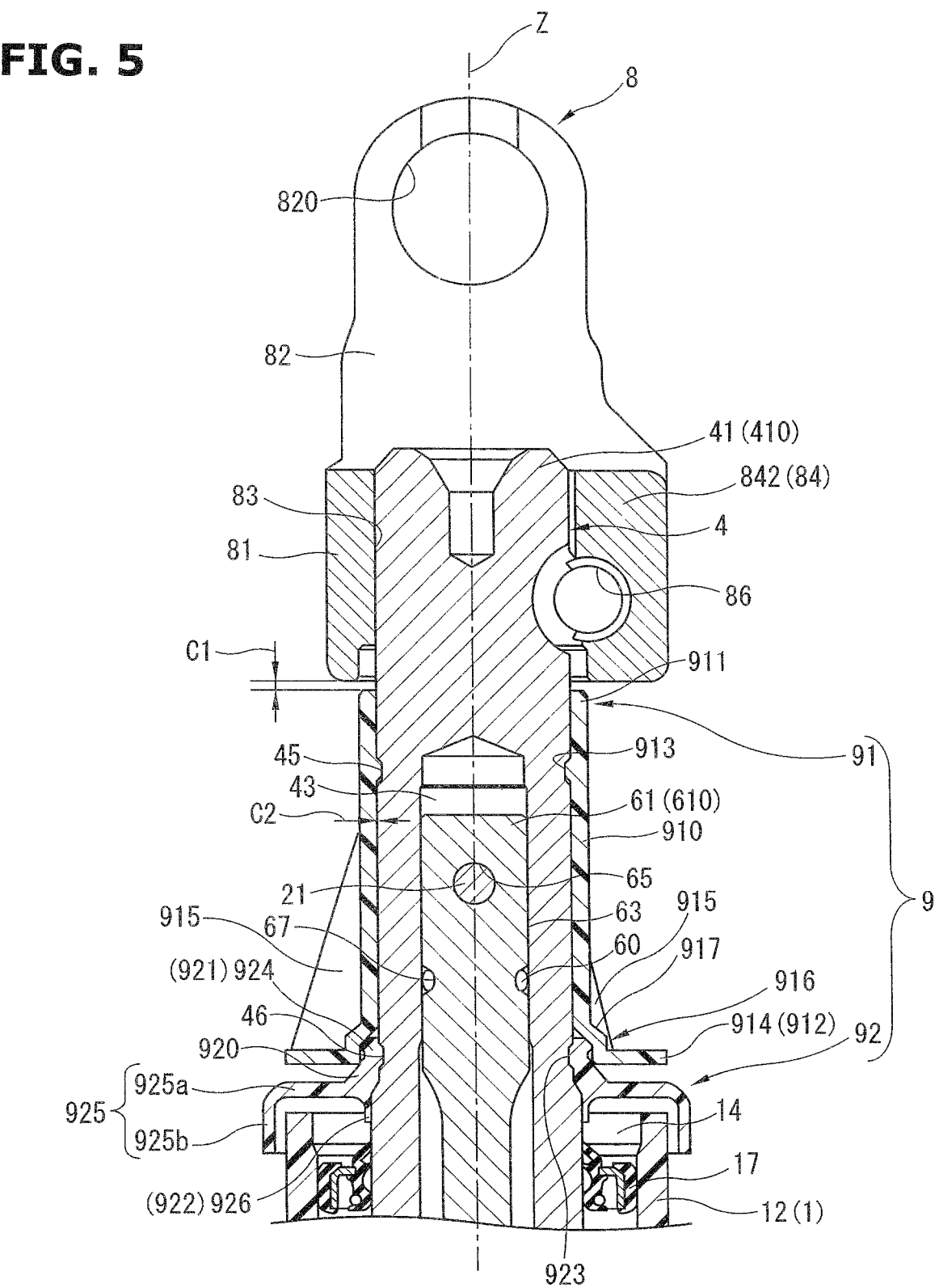
FIG. 5 is a sectional view taken along a section line A-A of FIG. 4.
Figure 6A:
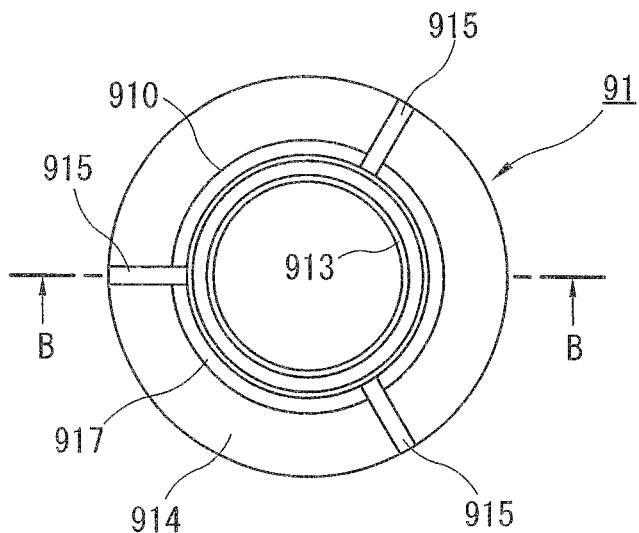
FIGS. 6A and 6B are views showing only an input shaft cover shown in FIG. 4.
Figure 6B:
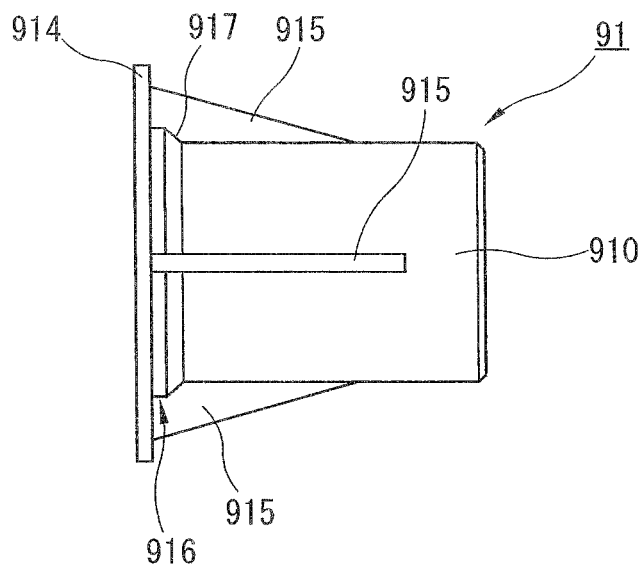
Figure 7:
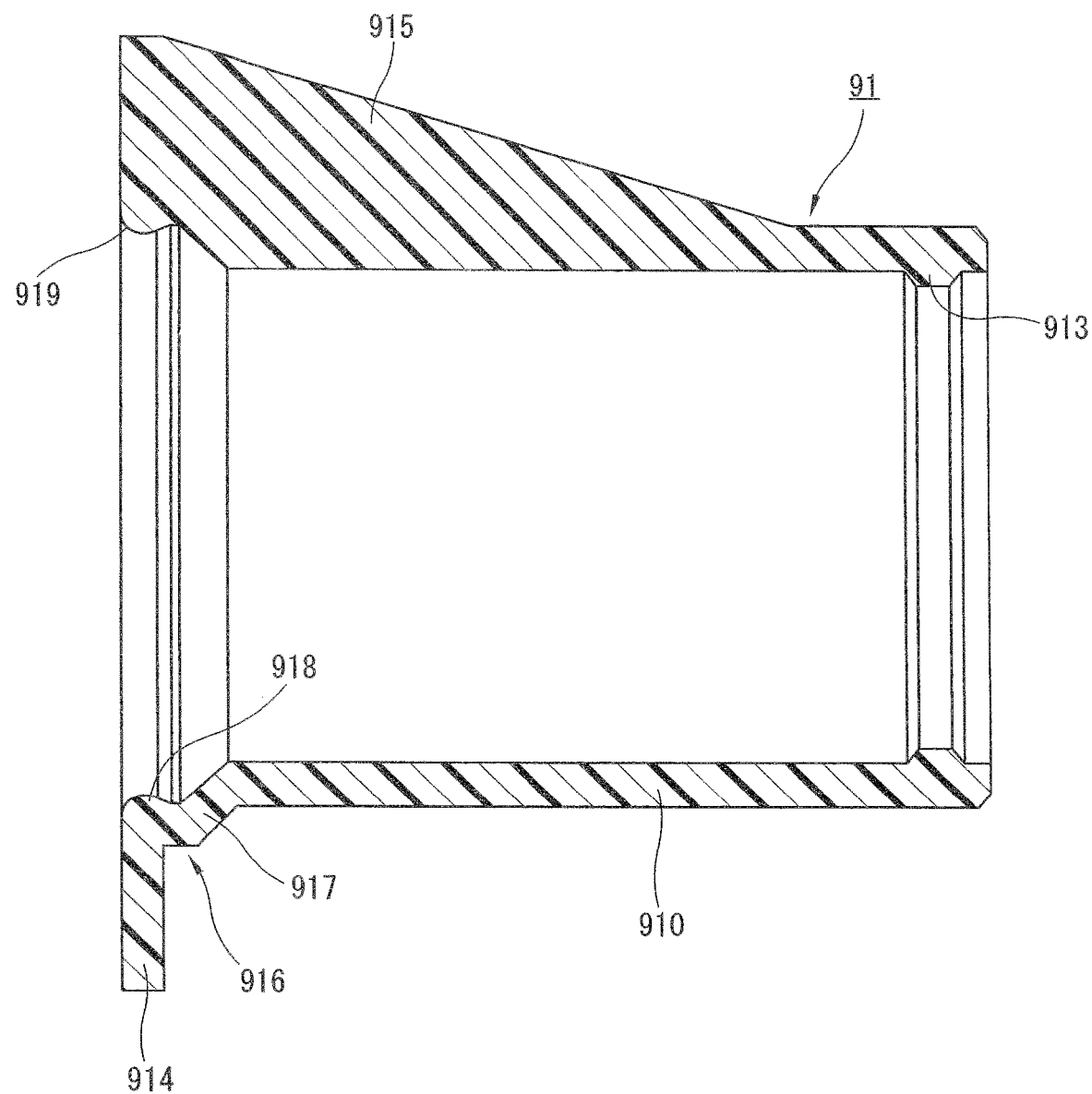
FIG. 7 is a sectional view taken along a section line B-B of FIG. 6A.
Figure 8:
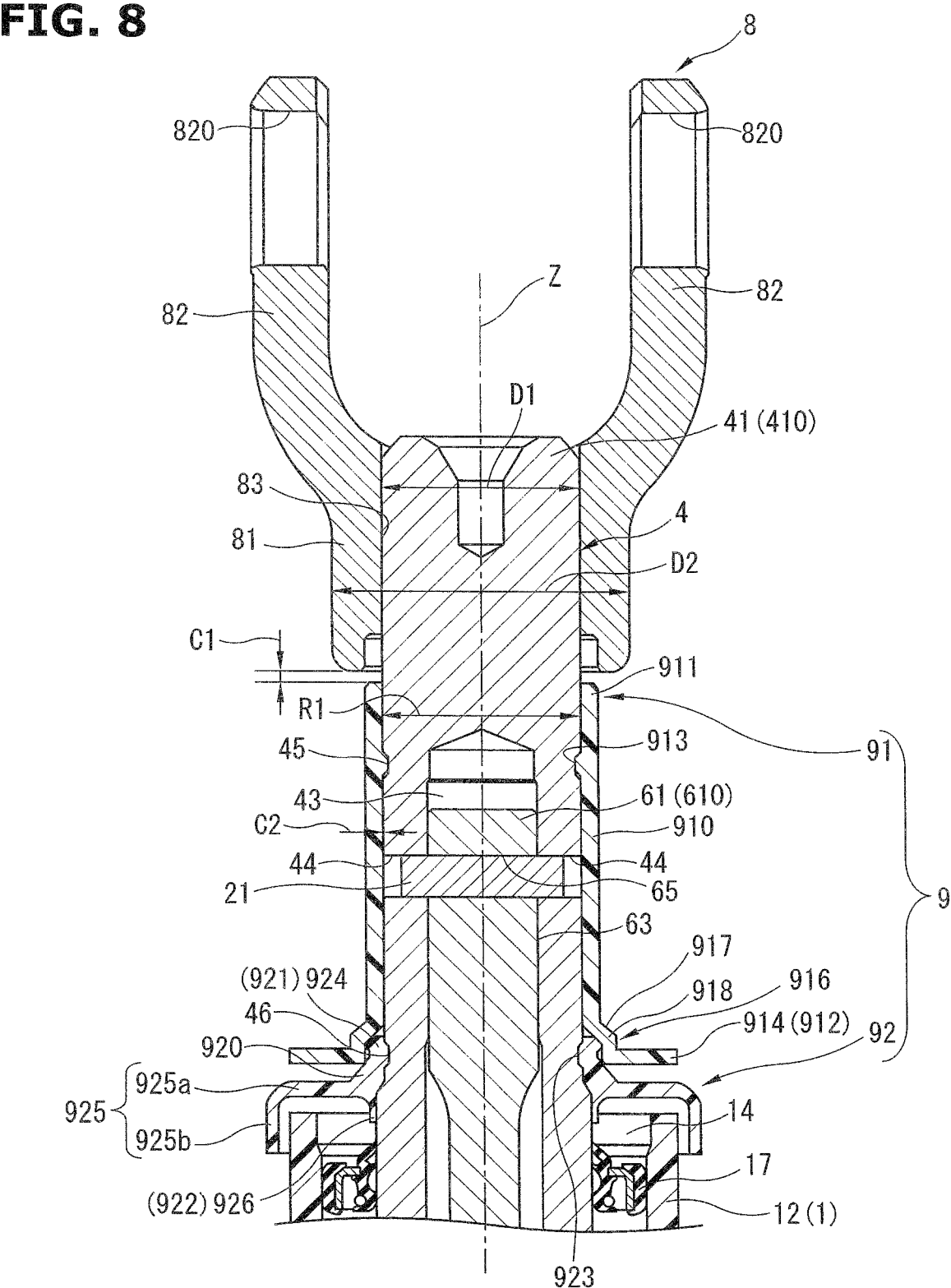
FIG. 8 is a sectional view taken along an axial direction of a steering shaft of a steering device according to a second embodiment of the present invention.

FIG. 4 is an enlarged sectional view showing main parts of the steering device by enlarging a portion near the input shaft cover 9 of the steering device shown in FIG. 2. FIG. 5 is a sectional view taken along an A-A line in FIG. 4. FIGS. 6A and 6B are views showing only the first input shaft cover member 91. FIG. 6A is a plan view. FIG. 6B is a side view. FIG. 7 is a sectional view which is taken along a B-B line of FIG. 6B, and which shows the input shaft cover 9. Besides, in below-described explanations based on the drawings, an "axial direction" is defined by a direction parallel to the rotation axis Z of the input shaft main body portion 40. A "radial direction" is defined by a direction perpendicular to the rotation axis Z of the input shaft main body portion 40. A "circumferential direction" is defined by a direction around the rotation axis Z of the input shaft main body portion 40. A "first end side" in the axial direction is defined by upper sides in FIG. 4 and FIG. 5. A "second end side" is defined by lower sides in FIG. 4 and FIG. 5. Furthermore, an end portion of the first input shaft cover member 91 on the first end side in the axial direction is referred to as a "first input shaft cover member first end portion 911". An end portion of the first input shaft cover member 91 on the second end side in the axial direction is referred to as a "first input shaft cover member second end portion 912". Similarly, an end portion of the second input shaft cover member 92 on the first end side in the axial direction is referred to as a "second input shaft cover member first end portion 921". An end portion of the second input shaft cover member 92 on the second end side in the axial direction is referred to as a "second input shaft cover member second end portion 922".

As shown in FIG. 4 to FIG. 7, the first input shaft side cover member 91 includes a first input shaft cover member main body portion 910 corresponding to an input shaft cover main body portion having a substantially cylindrical shape; and the first input shaft cover seal portion 913 which is provided on the inner circumference side of the first input shaft cover member main body portion 910, and which is abutted on the first input shaft seal portion 45 to liquid-tightly seal between the input shaft 4 and the input shaft cover 9 (the first input shaft cover member 91). Besides, the only first input shaft cover seal member 913 seals between the first input shaft cover member 91 and the input shaft 4, without providing other members between the first input shaft cover member 91 and the input shaft 4.

The first input shaft cover seal portion 913 is provided at an axial position closer to the input shaft first end portion 41, and at a position closer to the input shaft second end portion 42 than the first input shaft cover member first end portion 911 which is the input shaft cover first end portion. The first input shaft cover seal portion 913 has an inside diameter slightly greater than an outside diameter of the first input shaft seal portion 45. The first input shaft cover seal portion 913 is elastically abutted on the first input shaft seal portion 45 with a predetermined margin (fastening margin, interference). That is, the first input shaft cover member 91 is provided to the input shaft 4 to rotate as a unit with the input shaft 4, based on the elastic abutment of the first input shaft cover seal portion 913 on the first input shaft seal portion 45.

Moreover, the first input shaft cover member main body portion 910 has an inside diameter R1 slightly greater than the outside diameter D1 of the input shaft main body portion 40. The first input shaft cover seal portion 913 has a protruding amount slightly greater than a depth of the first input shaft seal portion 45. With these, the first input shaft cover member main body portion 910 is apart from the input shaft 4 in the radial direction, at least in a region which is closer to the input shaft second end portion 42 than the first input shaft cover seal portion 913 (at least on the input shaft second end portion 42 side of the first input shaft cover seal portion 913). That is, a slight radial clearance C2 is formed between the first input shaft cover member main body portion 910 and the input shaft main body portion 40, at least in the region which is closer to the input shaft second end portion 42 than the first input shaft cover seal portion 913.

Furthermore, the first input shaft cover member main body portion 910 includes a first input shaft cover member flange portion 914 which is formed in a predetermined axial region (in the second axial end portion in this embodiment) including the first input shaft cover member second end portion 912, and which protrudes from the first input shaft cover member main body portion 910 in the radially outward direction. Furthermore, the first input shaft cover member main body portion 910 includes a plurality of first input shaft cover member ribs 915 (three first input shaft cover member ribs 915 in this embodiment) formed radially outside the first input shaft cover member main body portion 910 on the first input shaft cover member flange portion 914 side of the first input shaft cover seal portion 913 in the axial direction.

As shown in FIG. 6A, the first input shaft cover member ribs 915 are disposed at a substantially regular interval (substantially 120 degrees) in the circumferential direction. Moreover, as shown in FIG. 6B, each of the first input shaft cover member ribs 915 has a tapered shape whose a protruding amount is gradually increased toward the first input shaft cover member flange portion 914. These first input shaft cover member ribs 915 increase rigidity of the first input shaft cover member 91. That is, by the increase of the rigidity of the first input shaft cover member 91 by the first input shaft cover member ribs 915, it is possible to improve the mounting rigidity and the durability of the first input shaft cover member 91, and to improve the mounting workability of the first input shat cover member 91 to the input shaft 4.

Moreover, as shown in FIG. 7 and so on, the first input shaft cover member main body portion 910 includes a first input shaft cover member increasing diameter portion 916 which is formed in a predetermined axial region (in the second axial end portion in this embodiment) including the first input shaft cover member second end portion 912, and which is formed by stepwisely increasing the inside diameters of the first input shaft cover member 91 toward the first input shaft cover member second end portion 912. This first input shaft cover member increasing diameter portion 916 includes a first input shaft cover member conical portion 917 which is formed at a base end portion of the first input shaft cover member increasing diameter portion 916, and in which the inside diameter of the first input shaft cover member 91 is gradually increased toward the first input shaft cover member second end portion 912. The first input shaft cover member conical portion 917 has the conical shape (the tapered shape) formed by gradually decreasing the inside diameter toward the axial first end side. With this, the first input shaft cover member conical portion 917 is arranged to push a second input shaft cover member abutment portion 924 (described later) abutted on the inside of the first input shaft cover member conical portion 917, in the radially inward direction. With this, it is possible to further strongly contact the second input shaft cover seal portion 923 on the second input shaft seal portion 46, and to thereby improve the seal characteristics by the first input shaft cover seal portion 913.

Moreover, the first input shaft cover member main body portion 910 includes a first input shaft cover member abutment portion 918 which is formed at the second axial end portion of the first input shaft cover member main body portion 910, on an inner circumference side of the first input shaft cover member main body portion 910, on the first input shaft cover member second end portion 912 side of the first input shaft cover member conical portion 917, which protrudes in the radially inward direction, and which is arranged to be abutted on the second input shaft cover member 92 (the second input shaft cover member abutment portion 924 described later). This first input shaft cover member abutment portion 918 has a vertical section which is a substantially arc raised shape. The first input shaft cover member abutment portion 918 includes a first input shaft cover member taper portion 919 which is formed at the second axial end portion of the first input shaft cover member abutment portion 918, and which is formed so that the inside diameter of the first input shaft cover member 91 is gradually increased toward the first input shaft cover member second end portion 912.

The first input shaft cover member 91 has an extension amount of the first axial end portion which is set so that a clearance C1 between the first input shaft cover member first end portion 911 and the universal joint 8 is smaller than the first length which is a difference between the outside diameter of the universal joint 8 (the outside diameter D2 of the base portion 81), and the outside diameter of the input shaft 4 (the outside diameter D1 of the input shaft main body portion 40).

On the other hand, as shown in FIG. 4 and FIG. 5, the second input shaft cover member 92 includes a second input shaft cover member main body portion 920 having a substantially cylindrical shape; and the second input shaft cover seal portion 923 which is provided radially inside the second input shaft cover member main body portion 920, and which is arranged to be abutted on the second input shaft seal portion 46, and to thereby liquid-tightly seal between the input shaft 4 and the second input shaft cover member 92. Besides, the only second input shaft cover seal portion 923 liquid-tightly seals between the second input shaft cover member 92 and the input shaft 4, without providing other members between the second input shaft cover member 92 and the input shaft 4, similarly to the first input shaft cover member 91.

Moreover, a predetermined axial region of the second input shaft cover member 92 which includes the second input shaft cover member first end portion 921, and which is closer to the second input shaft cover member first end portion 921 is inserted into the first input shaft cover member 91. In this configuration, in the second input shaft cover member 92, an outside diameter of the second input shaft cover member abutment portion 924 inserted into and abutted on the first input shaft cover member 91 is set to be slightly greater than the inside diameter of the first input shaft cover member abutment portion 918 in a free state (in a no load state). That is, the second input shaft cover member 92 is constituted so that the second input shaft cover member abutment portion 924 is abutted on the inside of the first input shaft cover member abutment portion 918 with a predetermined tightening margin (interference). With this, it is possible to suppress the relative movement of the second input shaft cover member 92 with respect to the first input shaft cover member 91, and to suppress the generation of the trouble based on the generation of the relative movement between the first and second input shaft cover members 91 and 92, such as the generation of the abnormal noise and the deformation due to the abrasion.

Besides, "the second input shaft cover member abutment portion 924 is abutted on the inside of the first input shaft cover member abutment portion 918 with the predetermined tightening margin" means a state where the outside diameter of the second input shaft cover member abutment portion 924 is greater than the inside diameter of the first input shaft cover member abutment portion 918 in the free state (natural state) before the second input shaft cover member 92 is inserted into the first input shaft cover Member 91, and where second input shaft cover member 92 is press-fit in the first input shaft cover member 91.

The second input shaft cover seal portion 923 is provided between the first input shaft cover seal portion 913 of the first input shaft cover member 91, and the seal member 17 received within the housing 1 (the seal member receiving space 14 of the second housing 12), at an axial position overlapped with the second input shaft cover member abutment portion 924. The second input shaft cover seal portion 923 is elastically abutted on the second input shaft seal portion 46 based on the elastic force provided from the first input shaft cover member abutment portion 918. That is, the second input shaft cover member 92 is provided to the input shaft 4 to rotate as a unit with the input shaft 4, based on the elastic abutment of the second input shaft cover seal portion 923 with respect to the second input shaft seal portion 46.

Moreover, the second input shaft cover member main body portion 920 includes a second input shaft cover member flange portion 925 which is formed in a predetermined axial region (in the second axial end portion in this embodiment) including the second input shaft cover member second end portion 922, and which protrudes from the second input shaft cover member main body portion 920 in the radially outward direction. An outer circumference edge portion of this second input shaft cover member flange portion 925 is fold to be overlapped with the first end side opening portion of the second housing 12 in the axial direction, so that the second input shaft cover member flange portion 925 is formed into an umbrella (hood) shape covering the seal member receiving space 14. In particular, the second input shaft cover member flange portion 925 includes a radial extension portion 925a which extends in the radially outward direction, and which is overlapped with the seal member receiving space 14 in the radial direction; and an axial extension portion 925b which is bent from a radially outside end portion of the radial extension portion 925a toward the second axial end side, and which is overlapped with the seal member receiving space 14 in the axial direction.

Moreover, the second input shaft cover member main body portion 920 includes a second input shaft cover member lip portion 926 which is formed at the second axial end portion, which extends in the axial direction, and which is overlapped with the axial extension portion 925b of the second input shaft cover member flange portion 925 in the axial direction. Besides, this second input shaft cover member lip portion 926 has an extension amount by which the second input shaft cover member lip portion 926 enters the seal member receiving space 14 in the assembled state of the steering device, that is, the second input shaft cover member lip portion 926 is overlapped with the seal member receiving space 14 in the axial direction. With this, it is possible to increase the abutment area of the second input shaft cover member main body portion 920 with respect to the input shaft 4, and to further improve the sealing characteristics by the second input shaft cover member 92.

Furthermore, the torsion bar 6 includes a torsion bar seal groove 67 which has an annular shape, and which is formed in the torsion bar first fixing portion 63 at an axial position closer to the torsion bar second fixing portion 64 than the torsion bar retaining pin insertion hole 65 (at an axial position on the torsion bar second fixing portion 64 side of the torsion bar retaining pin insertion hole 65). This torsion bar seal groove 67 has an arc recessed vertical section. The torsion bar seal groove 67 is continuously formed in the circumferential direction. A torsion bar seal member 60 is mounted in this torsion bar seal groove 67. For example, the torsion bar seal member 60 is a known O ring.

The torsion bar seal member 60 has a wire diameter greater than a depth of the torsion bar seal groove 67. The torsion bar seal member 60 protrudes from the outer circumference surface of the torsion bar first fixing portion 63 in the radially outward direction in a state where the torsion bar seal member 60 is mounted in the torsion bar seal groove 67. With this, the torsion bar seal member 60 is elastically abutted on the inner circumference surface of the torsion bar insertion hole 43 in a state where the torsion bar 6 is inserted into the torsion bar insertion hole 43 of the input shaft 4. That is, it is possible to suppress the moisture entering from the outside through the input shaft retaining pin insertion hole 44, from entering through the torsion bar insertion hole 43 into the housing 1, by the elastic abutment of the torsion bar seal member 60 on the inner circumference surface of the torsion bar insertion hole 44.

(Operations and Effects in this Embodiment)

In the conventional steering device, the cover member covers the only opening portion of the steering shaft receiving space. Accordingly, it is possible to suppress the foreign object and the moisture which enter the steering shaft receiving space. On the other hand, it is difficult to prevent the rust to a portion of the input shaft which is exposed from the steering shaft receiving space. Consequently, the rust is generated in a portion of the input shaft around the seal member. The input shaft in which the rust is generated is rotated so that the input shaft is abutted and slid on the seal member. With this, the seal member may be damaged due to the rust generated in the rust.

Contrary to this, in the steering device according to the embodiment, it is possible to attain below-described effects, and to dissolve the above-described problems in the conventional steering device.

A steering device according to the embodiment of the present invention includes:

a housing (1) including a steering shaft receiving space (13), and a seal member receiving space (14);

an input shaft (4) made from a metal, the input shaft including;

an input shaft main body portion (40) which has a rod shape, which is rotatably received in the steering shaft receiving space (13), which includes an input shaft first end portion (41) and an input shaft second end portion (42) that are both end portions in a rotation axis direction of the input shaft main body portion (40), and which includes an input shaft first region (410) that includes the input shaft first end portion (41), and that protrudes from the housing (1), and an input shaft second region (420) that includes the input shaft second end portion (42), and that is received within the steering shaft receiving space (13), a torsion bar insertion hole (43) which is provided within the input shaft main body portion (40), and which extends from the input shaft second end portion (42) to the input shaft first end portion (41), an input shaft retaining pin insertion hole (44) which is provided in the input shaft first region (410), which extends across the torsion bar insertion hole (43) in a radial direction of the input shaft main body portion (40), and a first input shaft seal portion (45) provided in the input shaft first region (410) between the input shaft first end portion (41) and the input shaft retaining pin insertion hole (44) in the rotation axis direction of the input shaft main body portion (40);

an output shaft (5) rotatably provided within the steering shaft receiving space;

a torsion bar (6) having a rod shape, including a torsion bar first end portion (61) and a torsion bar second end portion (62) which are a pair of end portions, including a torsion bar first region (610) including the torsion bar first end portion (61), and a torsion bar second region (620) including the torsion bar second end portion (62), and the torsion bar including;

a torsion bar first fixing portion (63) which is provided in the torsion bar first region (610), and which includes a torsion bar retaining pin insertion hole (65) extending in the radial direction of the input shaft main body portion (44), and extending in series with the input shaft retaining pin insertion hole (65), and a torsion bar second fixing portion (64) provided in the torsion bar second region (620), and connected to the output shaft (5);

a retaining pin (21) which is inserted into the input shaft retaining pin insertion hole (44) and the torsion bar retaining pin insertion hole (65), and which connects the input shaft (4) and the torsion bar (6);

a seal member (17) provided within the seal member receiving space (14);

a transmitting shaft (3) arranged to turn steered wheels in accordance with the rotation of the output shaft (5);

an actuator (71) arranged to provide a steering force to the output shaft (5) in accordance with a torsion amount of the torsion bar (6); and an input shaft cover (9) including;

an input shaft cover main body portion (910) having a cylindrical shape, and surrounding a portion of the input shaft first region (410) which is closer to the input shaft second end portion (42) than the first input shaft seal portion (45) in the rotation axis direction of the input shaft main body portion (40), and an input shaft cover seal portion (913) provided to the input shaft cover main body portion (910), abutted on the first input shaft seal portion (45), and arranged to suppress moisture from entering between the input shaft (4) and the input shaft cover (9).

In this way, in this embodiment, the first input shaft cover seal portion 913 is provided at a position farther from the seal member 17 than the retaining pin 21. Accordingly, even when the moisture enters from the first input shaft cover seal portion 913, this moisture is difficult to reach the portion near the seal member 17. Consequently, it is possible to suppress the generation of the rust at the portion of the input shaft 4 near the seal member 17. Therefore, it is possible to decrease the damage of the seal member 17 according to the generation of the rust of the input shaft 4, and the risk of the moisture entering from the periphery of the seal member 17 into the housing 1.

Moreover, by providing the input shaft cover 9 (the first input shaft cover member 91), the first input shaft cover member 91 surrounds the retaining pin 21, and the input shaft retaining pin insertion hole 44. With this, it is possible to suppress the moisture entering through the input shaft retaining pin insertion hole 44, and the generation of the rust around the retaining pin 21 according to the entering moisture.

Furthermore, the first input shaft cover seal portion 913 provided to the input shaft cover 9 seals between the input shaft cover 9 and the input shaft 4. With this, another seal member does not need to be disposed between the input shaft cover 9 and the input shaft 4. Accordingly, it is possible to decrease the number of the components of the steering device.

Moreover, in this embodiment, the input shaft cover (9) includes a second input shaft cover seal portion (923) provided between the first input shaft cover seal portion (913) and the seal member (17) in the rotation axis direction of the input shaft main body portion (40).

In this way, in this embodiment, the second input shaft cover seal portion 923 is provided at a position closer to the seal member 17 than the first input shaft cover seal portion 913. With this, it is possible to secondarily pond the moisture entering the input shaft cover 9 beyond the first input shaft cover seal portion 913, by the second input shaft cover seal portion 923. Consequently, it is possible to suppress the moisture entering the input shaft cover 9 beyond the first input shaft cover seal portion 913, from moving around the seal member 17.

Moreover, in this embodiment, the input shaft cover (9) includes a first input shaft cover member (91) surrounding a predetermined axial range of the input shaft first region (410) which includes the first input shaft seal portion (45) in the rotation direction of the input shaft main body (40), and a second input shaft cover member (92) provided closer to the input shaft second end portion (42) than to the first input shaft cover member in the rotation axis direction of the input shaft main body portion (91).

In this way, in this embodiment, the input shaft cover 9 has a divided structure divided in the axial direction. With this, it is possible to commonly use the second input shaft cover member 92 with respect to a plurality of different specifications of the steering devices. Moreover, it is possible to improve the degree of the freedom of the design with respect to the plurality of the specifications of the steering devices, for example, by independently designing the first input shaft cover member 91, and to attain the decrease of the manufacturing cost.

Moreover, in this embodiment, the first input shaft cover member (91) includes a first input shaft cover member abutment portion (918); the second input shaft cover member (92) includes a second input shaft cover member abutment portion (924), and includes a second input shaft cover member first end portion (921) and a second input shaft cover member second end portion (922) which are both end portions in the rotation axis direction of the input shaft main body portion (40); the second input shaft cover member first end portion (921) is closer to the input shaft first end portion (41) than the second input shaft cover ember second end portion (922); a predetermined region including the second input shaft cover member abutment portion (324) and the second input shaft cover member first end portion (921) is inserted into the first input shaft cover member (91) in the rotation axis direction of the input shaft main body portion (40); and the second input shaft cover member abutment portion (924) is abutted on the first input shaft cover member abutment portion (918) with a tightening margin.

In this way, in this embodiment, the first input shaft cover member 91 and the second input shaft cover member 92 are abutted on each other with the tightening margin (interference). With this, it is possible to suppress the moisture entering from between the cover members 91 and 92.

Moreover, the second input shaft cover member 92 provided on the lower side in the vertical direction is inserted into the first input shaft cover member 91. With this, it is possible to suppress the moisture dropping from the upper side in the vertical direction, from entering between the both cover members 91 and 92.

Moreover, in this embodiment, the second input shaft cover member (92) includes a second input shaft cover seal portion (923) provided between the first input shaft cover seal portion (913) and the seal member (17) in the rotation axis direction of the input shaft main body portion (40), at a position at which the second input shaft cover seal portion (923) is overlapped with the second input shaft cover member abutment portion (924) in the rotation axis direction of the input shaft main body portion (40).

In this way, in this embodiment, the second input shaft cover seal portion 923 is provided between the first input shaft cover seal portion 913 and the seal member 17, at the axial position at which the second input shaft cover seal portion 923 is overlapped with the second input shaft cover member abutment portion 924. With this, the second input shaft cover seal portion 923 is compressed (constricted, fastened) by the first input shaft cover member abutment portion 918 to decrease the diameter of the second input shaft cover seal portion 923. Accordingly, it is possible to improve the seal characteristics at the second input shaft cover seal portion 923.

Moreover, in this embodiment, the second input shaft cover member (92) includes a second input shaft cover member first end portion (321) and a second input shaft cover member second end portion (922) which are a pair of end portions in the rotation axis direction of the input shaft main body portion (40); the second input shaft cover member first end portion (321) is closer to the input shaft first end portion (41) than the second input shaft cover member second end portion (922); and a predetermined region of the second input shaft cover member (92) which includes the second input shaft cover member first end portion (921) is inserted into the first input shaft cover member (91) in the rotation axis direction of the input shaft main body portion (40).

In this way, in this embodiment, the second input shaft cover member 92 provided on the lower side in the vertical direction is inserted into the first input shaft cover member 91. With this, it is possible to suppress the moisture dropping from the upper side in the vertical direction, from entering between the both cover members 91 and 92.

Moreover, in this embodiment, the first input shaft cover member (91) includes a first input shaft cover member main body portion (910) having a cylindrical shape, and a first input shaft cover member flange portion (914); the input shaft main body portion (40) includes a first input shaft cover member first end portion (911) and a first input shaft cover member second end portion (912) which are both end portions in the rotation axis direction of the input shaft main body portion (40); the first input shaft cover member second end portion (912) is closer to the input shaft second end portion (42) than the first input shaft cover member first end portion (911); the first input shaft cover member flange portion (914) is formed in a predetermined region including the first input shaft cover member second end portion (912); and the first input shaft cover member flange portion (914) protrudes from the first input shaft cover member main body portion (910) in a radially outward direction of the input shaft main body portion (40).

In this way, in this embodiment, the first input shaft cover member flange portion 914 is provided on the outside of the axial second end portion of the first input shaft cover member 91. With this, the moisture dropping from the upper side in the vertical direction is blocked by the first input shaft cover member flange portion 914. Accordingly, it is possible to more effectively suppress the moisture from entering between the first input shaft cover member 91 and the second input shaft cover member 92.

Moreover, by providing the first input shaft cover member flange portion 914, it is possible to place the hand on the first input shaft cover member flange portion 914 in a case where the first input shaft cover member 91 is assembled to the input shaft 4 by the manual operation. Accordingly, it is possible to improve the assembling workability of the first input shaft cover member 91 to the input shaft 4.

Moreover, in this embodiment, the first input shaft cover member (91) includes a first input shaft cover member taper portion (919) opened on the first input shaft cover member second end portion (912) of the first input shaft cover member (91); and the first input shaft cover member taper portion (919) has diameters gradually increased toward the first input shaft cover member second end portion (912).

In this way, in this embodiment, the first input shaft cover member taper portion 919 is provided on the inside portion of the axial second end portion of the first input shaft cover member 91. The first input shaft cover member taper portion 919 is arranged to guide the insertion of the second input shaft cover member into the first input shaft cover member 91. With this, it is possible to improve the insertion characteristics of the second input shaft cover member 92 with respect to the first input shaft cover member 91.

Moreover, in this embodiment, the second input shaft cover member abutment portion (924) is provided in the first input shaft cover taper portion (919); the first input shaft cover member (91); and the first input shaft cover member (91) is abutted on the second input shaft cover member abutment portion (924) at the first input shaft cover member abutment portion (918); and the first input shaft cover member (91) is apart from the second input shaft cover member (92) in a region closer to the input shaft first end portion (41) than the first input shaft cover abutment portion (918) in the rotation axis direction of the input shaft main body portion (40).

In this way, in this embodiment, the first input shaft cover member 91 and the second input shaft cover member 92 are apart from each other at a portion closer to the input shaft first end portion 41 than the first input shaft cover member abutment portion 918, that is, at a portion other than the first input shaft cover member abutment portion 918 which is the tightening margin. With this, it is possible to suppress the decrease of the tightening effect in the first input shaft cover member abutment portion 918.

Moreover, in this embodiment, the first input shaft cover member (91) and the second input shaft cover member (92) are made from the same material.

In this way, in this embodiment, the first input shaft cover member 91 and the second input shaft cover member 92 are made from the same material (elastomer in this embodiment). Accordingly, it is possible to suppress the clearance between the both cover members 91 and 92 from increasing due to the thermal expansion or the cooling contradiction by the difference of the linear expansion coefficients.

Moreover, in this embodiment, the first input shaft cover member (91) is apart from the input shaft (4) in the radial direction of the input shaft main body portion (40), in a region which is closer to the input shaft second end portion (42) than the first input shaft cover seal portion (913) in the rotation axis direction of the input shaft main body portion (40).

In this way, in this embodiment, the first input shaft cover 91 and the input shaft 4 are apart from each other in the radial direction on the second axial side of the first input shaft cover seal portion 913, so as to decrease the contact area of the first input shaft cover member 91 with respect to the input shaft 4. With this, it is possible to decrease the sliding resistance generated at the mounting operation of the first input shaft cover member 91 with respect to the input shaft 4, and thereby to improve the assembling operation of the input shaft cover member 91.

Moreover, in this embodiment, the input shaft cover (9) is arranged to rotate as a unit with the input shaft (4) in accordance with the rotation of the input shaft (4).

In this way, in this embodiment, the input shaft cover 9 and the input shaft 4 are rotated as a unit with each other, so that the input shaft cover 9 and the input shaft 4 are not relatively rotated each other. With this, the sliding movement is not generated between the first input shaft seal portion 45 and the first input shaft cover seal portion 913 in accordance with the relative rotation between the first input shaft seal portion 45 and the first input shaft cover seal portion 913. Accordingly, it is possible to suppress the decrease of the sealing characteristics at the first input shaft cover seal portion 913.

Moreover, in this embodiment, the input shaft (4) is arranged to be connected through a universal joint (8) to a steering wheel side steering shaft (22) connected to a steering wheel (SW);

the universal joint (8) has an outside diameter (outside diameter D2 of the base portion 81) greater than an outside diameter (outside diameter D4 of the input shaft main body portion 40) of the input shaft (4) by a first length;

the input shaft cover (9) includes an input shaft cover first end portion (911) and an input shaft cover second end portion (912) which are a both end portions in the rotation axis direction of the input shaft main body (40);

the input shaft cover first end portion (911) is closer to the input shaft first end portion (41) that the input shaft cover second end portion (912); and a clearance (C1) between the universal joint (8) and the input shaft cover first end portion (911) is set to be smaller than the first length.

In this way, in this embodiment, the clearance C1 between the input shaft cover 9 and the universal joint 8 is set to be shorter than the first length. With this, it is possible to suppress the moisture from entering from between the input shaft 4 and the input shaft cover 9.

Moreover, the universal joint 8 having the large diameter is provided right above the clearance C1. Accordingly, it is possible to suppress the moisture dropping from the upper side, from entering the clearance C1.

Moreover, in this embodiment, the input shaft cover (9) includes an input shaft over first end portion (911) and an input shaft cover second end portion (912) which are both end portions in the rotation axis direction of the input shaft main body portion (40); the first input shaft cover first end portion (911) is closer to the input shaft first end portion (41); and the first input shaft cover seal portion (913) is closer to the input shaft first end portion (911) than the input shaft cover second end portion (913) to have a predetermined length between the input shaft first end portion (41) and the input shaft first end portion (911) in the rotation axis direction of the input shaft main body portion (40).

In this way, in this embodiment, the input shaft cover main body portion 910 extends beyond the first input shaft cover seal portion 913 to a portion near the input shaft first end portion 41. With this, in an extension portion extending beyond the first input shaft cover seal portion 913 to the input shaft first end portion 41, it is possible to suppress the decrease of the rigidity due to an influence of an inner stress (creep generation risk) in the first input shaft cover seal portion 913 which is a tightening margin). Accordingly, in the input shaft cover 9, it is possible to suppress the decrease of the rigidity due to the generation of the creep in the input shaft cover first end portion (the first input shaft cover portion cover seal portion 913 in this embodiment), and thereby to suppress the decrease of the sealing characteristics of the first input cover seal portion 913.

Moreover, in this embodiment, the input shaft cover (9) is provided to the input shaft (4) without providing other members between the input shaft (4) and the input shaft cover (9).

For example, seal members such as O ring is disposed between the input shaft cover 9 and the input shaft 4. With this, it is possible to seal between the input shaft cover 9 and the input shaft 4. However, this seal member is omitted. With this, it is possible to decrease the numbers of the components.

Second Embodiment

FIG. 9 is a view showing a steering device according to a second embodiment of the present invention. In this embodiment, the torsion bar seal member 60 in the first embodiment is not used. Other configurations are identical to those of the first embodiment. Accordingly, the same configurations has the same symbols to omit the explanations.

FIG. 9 is an enlarged sectional view showing main parts of the steering device according to the second embodiment of the present invention. In below-described explanations based on FIG. 9, an "axial direction" is defined by a direction parallel to a rotation axis Z of the input shaft 4. A "radial direction" is defined by a direction perpendicular to the rotation axis Z of the input shaft 4. A "circumferential direction" is defined by a direction around the rotation axis Z of the input shaft 4.

As shown in FIG. 9, in this embodiment, the torsion bar 60 of the first embodiment which is disposed between the input shaft 1 and the torsion bar 6, that is, between the inside surface of the torsion bar insertion hole 43 and the outside surface of the torsion bar first fixing portion 63 is not used. The torsion bar seal groove 67 of the torsion bar first fixing portion 63 is disused in accordance with the disuse of the torsion bar seal member 60, so that the outside surface of the torsion bar first fixing portion 63 is formed into a flat surface having a constant outside diameter.

In this embodiment, as described above, the torsion bar seal member 60 disposed between the input shaft 4 and the torsion bar 6 in the first embodiment is disused. With this, it is possible to decrease the number of the components of the steering device. Accordingly, it is possible to simplify the configuration of the steering device, to improve the productivity of the steering device, and to decrease the manufacturing cost of the steering device.

That is, the first input shaft cover seal portion 913 of the first input shaft cover member 91 ponds up the moisture from the outside. With this, it is possible to suppress the water entering from the outside through the input shaft retaining pin insertion hole 44. Accordingly, it is possible to decrease the risk in which the moisture enters from the outside through the input shaft retaining pin insertion hole 44 into the housing 1, even when the torsion bar seal member 60 is disused.

The present invention is not limited to the above-described embodiments. It is possible to arbitrarily vary concrete aspects according to the present invention in accordance with specifications and so on of the steering device as long as the concrete aspects can attain the operations and the effects by the present invention.

Below-described aspects are conceivable as the steering device according to the embodiment of the present invention.

A steering device according to one aspect of the present invention includes: a housing including a steering shaft receiving space, and a seal member receiving space; an input shaft made from a metal, the input shaft including; an input shaft main body portion which has a rod shape, which is rotatably received in the steering shaft receiving space, which includes an input shaft first end portion and an input shaft second end portion that are both end portions in a rotation axis direction of the input shaft main body portion, and which includes an input shaft first region that includes the input shaft first end portion, and that protrudes from the housing, and an input shaft second region that includes the input shaft second end portion, and that is received within the steering shaft receiving space, a torsion bar insertion hole which is provided within the input shaft main body portion, and which extends from the input shaft second end portion to the input shaft first end portion, an input shaft retaining pin insertion hole which is provided in the input shaft first region, which extends across the torsion bar insertion hole in a radial direction of the input shaft main body portion, and a first input shaft seal portion provided in the input shaft first region between the input shaft first end portion and the input shaft retaining pin insertion hole in the rotation axis direction of the input shaft main body portion; an output shaft rotatably provided within the steering shaft receiving space; a torsion bar having a rod shape, including a torsion bar first end portion and a torsion bar second end portion which are a pair of end portions, including a torsion bar first region including the torsion bar first end portion, and a torsion bar second region including the torsion bar second end portion, and the torsion bar including; a torsion bar first fixing portion which is provided in the torsion bar first region, and which includes a torsion bar retaining pin insertion hole extending in the radial direction of the input shaft main body portion, and extending in series with the input shaft retaining pin insertion hole, and a torsion bar second fixing portion provided in the torsion bar second region, and connected to the output shaft; a retaining pin which is inserted into the input shaft retaining pin insertion hole and the torsion bar retaining pin insertion hole, and which connects the input shaft and the torsion bar; a seal member provided within the seal member receiving space; a transmitting shaft arranged to turn steered wheels in accordance with the rotation of the output shaft; an actuator arranged to provide a steering force to the output shaft in accordance with a torsion amount of the torsion bar; and an input shaft cover including; an input shaft cover main body portion having a cylindrical shape, and surrounding a portion of the input shaft first region which is closer to the input shaft second end portion than the first input shaft seal portion in the rotation axis direction of the input shaft main body portion, and an input shaft cover seal portion provided to the input shaft cover main body portion, abutted on the first input shaft seal portion, and arranged to suppress moisture from entering between the input shaft and the input shaft cover.

In the steering device according to a preferable aspect, the input shaft cover includes a second input shaft cover seal portion provided between the first input shaft cover seal portion and the seal member in the rotation axis direction of the input shaft main body portion.

In the steering device according to another preferable aspect, the input shaft cover includes a first input shaft cover member surrounding a predetermined axial range of the input shaft first region which includes the first input shaft seal portion in the rotation direction of the input shaft main body, and a second input shaft cover member provided closer to the input shaft second end portion than to the first input shaft cover member in the rotation axis direction of the input shaft main body portion.

In the steering device according to still another preferable aspect, the first input shaft cover member includes a first input shaft cover member abutment portion; the second input shaft cover member includes a second input shaft cover member abutment portion, and includes a second input shaft cover member first end portion and a second input shaft cover member second end portion which are both end portions in the rotation axis direction of the input shaft main body portion; the second input shaft cover member first end portion is closer to the input shaft first end portion than the second input shaft cover ember second end portion; a predetermined region including the second input shaft cover member abutment portion and the second input shaft cover member first end portion is inserted into the first input shaft cover member in the rotation axis direction of the input shaft main body portion; and the second input shaft cover member abutment portion is abutted on the first input shaft cover member abutment portion with a tightening margin.

In the steering device according to still another preferable aspect, the second input shaft cover member includes a second input shaft cover seal portion provided between the first input shaft cover seal portion and the seal member in the rotation axis direction of the input shaft main body portion, at a position at which the second input shaft cover seal portion is overlapped with the second input shaft cover member abutment portion in the rotation axis direction of the input shaft main body portion.

In the steering device according to still another preferable aspect, the second input shaft cover member includes a second input shaft cover member first end portion and a second input shaft cover member second end portion which are a pair of end portions in the rotation axis direction of the input shaft main body portion; the second input shaft cover member first end portion is closer to the input shaft first end portion than the second input shaft cover member second end portion; and a predetermined region of the second input shaft cover member which includes the second input shaft cover member first end portion is inserted into the first input shaft cover member in the rotation axis direction of the input shaft main body portion.

In the steering device according to still another preferable aspect, the first input shaft cover member includes a first input shaft cover member main body portion having a cylindrical shape, and a first input shaft cover member flange portion; the input shaft main body portion includes a first input shaft cover member first end portion and a first input shaft cover member second end portion which are both end portions in the rotation axis direction of the input shaft main body portion; the first input shaft cover member second end portion is closer to the input shaft second end portion than the first input shaft cover member first end portion; the first input shaft cover member flange portion is formed in a predetermined region including the first input shaft cover member second end portion; and the first input shaft cover member flange portion protrudes from the first input shaft cover member main body portion in a radially outward direction of the input shaft main body portion.

In the steering device according to still another preferable aspect, the first input shaft cover member includes a first input shaft cover member taper portion opened on the first input shaft cover member second end portion of the first input shaft cover member; and the first input shaft cover member taper portion has diameters gradually increased toward the first input shaft cover member second end portion.

In the steering device according to still another preferable aspect, the second input shaft cover member abutment portion is provided in the first input shaft cover taper portion; the first input shaft cover member; and the first input shaft cover member is abutted on the second input shaft cover member abutment portion at the first input shaft cover member abutment portion; and the first input shaft cover member is apart from the second input shaft cover member in a region closer to the input shaft first end portion than the first input shaft cover abutment portion in the rotation axis direction of the input shaft main body portion.

In the steering device according to still another preferable aspect, the first input shaft cover member and the second input shaft cover member are made from the same material.

In the steering device according to still another preferable aspect, the first input shaft cover member is apart from the input shaft in the radial direction of the input shaft main body portion, in a region which is closer to the input shaft second end portion than the first input shaft cover seal portion in the rotation axis direction of the input shaft main body portion.

In the steering device according to still another preferable aspect, the input shaft cover is arranged to rotate as a unit with the input shaft in accordance with the rotation of the input shaft.

In the steering device according to still another preferable aspect, the input shaft is arranged to be connected through a universal joint to a steering wheel side steering shaft connected to a steering wheel; the universal joint has an outside diameter greater than an outside diameter of the input shaft by a first length; the input shaft cover includes an input shaft cover first end portion and an input shaft cover second end portion which are a both end portions in the rotation axis direction of the input shaft main body; the input shaft cover first end portion is closer to the input shaft first end portion that the input shaft cover second end portion; and a clearance between the universal joint and the input shaft cover first end portion is set to be smaller than the first length.

In the steering device according to still another preferable aspect, the input shaft cover includes an input shaft over first end portion and an input shaft cover second end portion which are both end portions in the rotation axis direction of the input shaft main body portion; the first input shaft cover first end portion is closer to the input shaft first end portion; and the first input shaft cover seal portion is closer to the input shaft first end portion than the input shaft cover second end portion to have a predetermined length between the input shaft first end portion and the input shaft first end portion in the rotation axis direction of the input shaft main body portion.

In the steering device according to still another preferable aspect, the input shaft cover is provided to the input shaft without providing other members between the input shaft and the input shaft cover.

The entire contents of Japanese Patent Application No. 2018-135439 filed Jul. 19, 2018 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:
1. A steering device comprising:
a housing including a steering shaft receiving space, and a seal member receiving space;
an input shaft made from a metal, the input shaft including:
an input shaft main body portion, which is rotatably received in the steering shaft receiving space, which includes an input shaft first end portion and an input shaft second end portion that are both end portions in a rotation axis direction of the input shaft main body portion, and which includes an input shaft first region that includes the input shaft first end portion, and that protrudes from the housing, and an input shaft second region that includes the input shaft second end portion, and that is received within the steering shaft receiving space,
a torsion bar insertion hole which is provided within the input shaft main body portion, and which extends from the input shaft second end portion to the input shaft first end portion,
an input shaft retaining pin insertion hole which is provided in the input shaft first region, which extends across the torsion bar insertion hole in a radial direction of the input shaft main body portion, and
a first input shaft seal portion provided in the input shaft first region between the input shaft first end portion and the input shaft retaining pin insertion hole in the rotation axis direction of the input shaft main body portion;
an output shaft rotatably provided within the steering shaft receiving space;
a torsion bar including a torsion bar first end portion and a torsion bar second end portion which are a pair of end portions, including a torsion bar first region including the torsion bar first end portion, and a torsion bar second region including the torsion bar second end portion, the torsion bar including:
  a torsion bar first fixing portion which is provided in the torsion bar first region, and which includes a torsion bar retaining pin insertion hole extending in the radial direction of the input shaft main body portion, and extending in series with the input shaft retaining pin insertion hole, and
  a torsion bar second fixing portion provided in the torsion bar second region, and connected to the output shaft;
a retaining pin which is inserted into the input shaft retaining pin insertion hole and the torsion bar retaining pin insertion hole, and which connects the input shaft and the torsion bar;
a seal member provided within the seal member receiving space;
a transmitting shaft arranged to turn steered wheels in accordance with the rotation of the output shaft;
an actuator arranged to provide a steering force to the output shaft in accordance with a torsion amount of the torsion bar; and
an input shaft cover including:
  a first input shaft cover main body portion having a cylindrical shape, and surrounding a portion of the input shaft first region which is closer to the input shaft second end portion than the first input shaft seal portion in the rotation axis direction of the input shaft main body portion, and
  a first input shaft cover seal portion provided to the first input shaft cover main body portion, abutted on the first input shaft seal portion, and arranged to suppress moisture from entering between the input shaft and the input shaft cover,
wherein the input shaft cover includes a first input shaft cover member and a second input shaft cover member which is press-fit into the first input shaft cover member.

2. The steering device as claimed in claim 1, wherein the input shaft cover includes a second input shaft cover seal portion provided between the first input shaft cover seal portion and the seal member in the rotation axis direction of the input shaft main body portion.

3. The steering device as claimed in claim 1, wherein the first input shaft cover member surrounds a predetermined axial range of the input shaft first region which includes the first input shaft seal portion in the rotation direction of the input shaft main body, and the second input shaft cover member is closer to the input shaft second end portion than to the first input shaft cover member in the rotation axis direction of the input shaft main body portion.

4. The steering device as claimed in claim 3, wherein the first input shaft cover member includes a first input shaft cover member abutment portion; the second input shaft cover member includes a second input shaft cover member abutment portion, and includes a second input shaft cover member first end portion and a second input shaft cover member second end portion which are both end portions in the rotation axis direction of the input shaft main body portion; the second input shaft cover member first end portion is closer to the input shaft first end portion than the second input shaft cover member second end portion; a predetermined region of the second input shaft cover member including the second input shaft cover member abutment portion and the second input shaft cover member first end portion is inserted into the first input shaft cover member in the rotation axis direction of the input shaft main body portion; and the second input shaft cover member abutment portion is abutted on the first input shaft cover member abutment portion with an interference.

5. The steering device as claimed in claim 4, wherein the second input shaft cover member includes a second input shaft cover seal portion provided between the first input shaft cover seal portion and the seal member in the rotation axis direction of the input shaft main body portion, at a position at which the second input shaft cover seal portion is overlapped with the second input shaft cover member abutment portion in the rotation axis direction of the input shaft main body portion.

6. The steering device as claimed in claim 3, wherein the second input shaft cover member includes a second input shaft cover member first end portion and a second input shaft cover member second end portion which are a pair of end portions in the rotation axis direction of the input shaft main body portion; the second input shaft cover member first end portion is closer to the input shaft first end portion than the second input shaft cover member second end portion; and a predetermined region of the second input shaft cover member which includes the second input shaft cover member first end portion is inserted into the first input shaft cover member in the rotation axis direction of the input shaft main body portion.

7. The steering device as claimed in claim 6, wherein the first input shaft cover main body portion has a cylindrical shape, the first input shaft cover member includes a first input shaft cover member flange portion; the input shaft main body portion includes a first input shaft cover member first end portion and a first input shaft cover member second end portion which are both end portions in the rotation axis direction of the input shaft main body portion; the first input shaft cover member second end portion is closer to the input shaft second end portion than the first input shaft cover member first end portion; the first input shaft cover member flange portion is formed in a predetermined region including the first input shaft cover member second end portion; and the first input shaft cover member flange portion protrudes from the first input shaft cover main body portion in a radially outward direction of the input shaft main body portion.

8. The steering device as claimed in claim 6, wherein the first input shaft cover member includes a first input shaft cover member taper portion opened on the first input shaft cover member second end portion of the first input shaft cover member; and the first input shaft cover member taper portion increases in diameter toward the first input shaft cover member second end portion.

9. The steering device as claimed in claim 8, wherein the first input shaft cover member includes a first input shaft cover member abutment portion; the second input shaft cover member includes a second input shaft cover member abutment portion provided in the first input shaft cover taper portion; the first input shaft cover member is abutted on the second input shaft cover member abutment portion at the first input shaft cover member abutment portion; and the first input shaft cover member is apart from the second input shaft cover member in a region closer to the input shaft first end portion than the first input shaft cover abutment portion in the rotation axis direction of the input shaft main body portion.

10. The steering device as claimed in claim 3, wherein the first input shaft cover member and the second input shaft cover member are made from the same material.

11. The steering device as claimed in claim 3, wherein the first input shaft cover member is apart from the input shaft in the radial direction of the input shaft main body portion, in a region which is closer to the input shaft second end portion than the first input shaft cover seal portion in the rotation axis direction of the input shaft main body portion.

12. The steering device as claimed in claim 1, wherein the input shaft cover is arranged to rotate as a unit with the input shaft in accordance with the rotation of the input shaft.

13. The steering device as claimed in claim 1, wherein the input shaft is arranged to be connected through a universal joint to a steering wheel side steering shaft connected to a steering wheel;
the universal joint has an outside diameter greater than an outside diameter of the input shaft by a first length;
the input shaft cover includes an input shaft cover first end portion and an input shaft cover second end portion which are both end portions in the rotation axis direction of the input shaft main body;
the input shaft cover first end portion is closer to the input shaft first end portion that the input shaft cover second end portion; and
a clearance between the universal joint and the input shaft cover first end portion is set to be smaller than the first length.

14. The steering device as claimed in claim 1, wherein the input shaft cover includes an input shaft cover first end portion and an input shaft cover second end portion which are both end portions in the rotation axis direction of the input shaft main body portion; the first input shaft cover first end portion is closer to the input shaft first end portion; and the first input shaft cover seal portion is closer to the input shaft first end portion than the input shaft cover second end portion so as to have a predetermined length between the input shaft first end portion and the input shaft first end portion in the rotation axis direction of the input shaft main body portion.

15. The steering device as claimed in claim 1, wherein the input shaft cover is provided to the input shaft without providing other members between the input shaft and the input shaft cover.

* * * * *